No. 792,608. PATENTED JUNE 20, 1905.
M. J. OWENS.
METHOD OF FORMING INTERIORLY GROOVED BOTTLE NECKS.
APPLICATION FILED MAR. 10, 1904.

WITNESSES
INVENTOR
MICHAEL J. OWENS
BY James Whittemore
ATT'Y.

No. 792,608. Patented June 20, 1905.

UNITED STATES PATENT OFFICE.

MICHAEL J. OWENS, OF TOLEDO, OHIO, ASSIGNOR TO THE TOLEDO GLASS COMPANY, OF TOLEDO, OHIO, A CORPORATION OF OHIO.

METHOD OF FORMING INTERIORLY-GROOVED BOTTLE-NECKS.

SPECIFICATION forming part of Letters Patent No. 792,608, dated June 20, 1905.

Application filed March 10, 1904. Serial No. 197,542.

*To all whom it may concern:*

Be it known that I, MICHAEL J. OWENS, a citizen of the United States, residing at Toledo, in the county of Lucas and State of Ohio, have invented certain new and useful Improvements in Methods of Forming Interiorly-Grooved Bottle-Necks, of which the following is a specification, reference being had therein to the accompanying drawings.

The invention relates to a new and improved process of making bottles with internal grooves in the neck; and it consists particularly in first making a bottle with an enlarged annular recess at the upper end of the neck and then in collapsing the glass at the top of the recess inward to form the internal groove.

The process further comprises the making of this bottle by forming the groove of the proper shape at the time of forming the blank from which the bottle is blown, as more fully hereinafter described.

Figure 1:
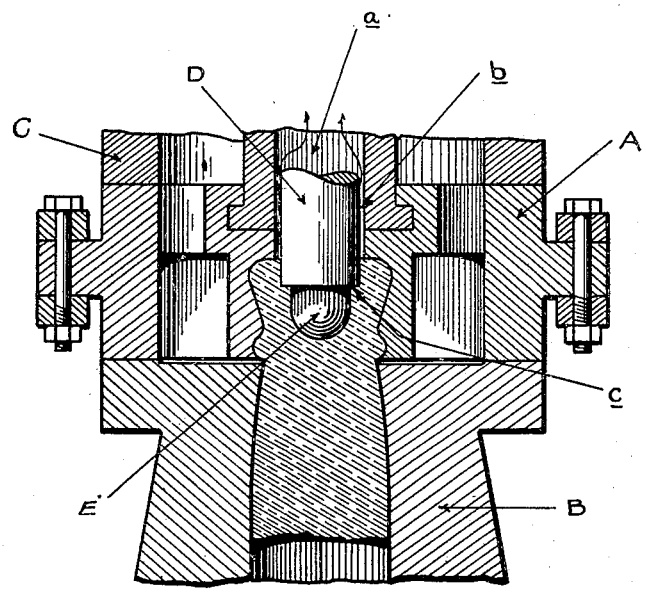
Figures 2, 3:
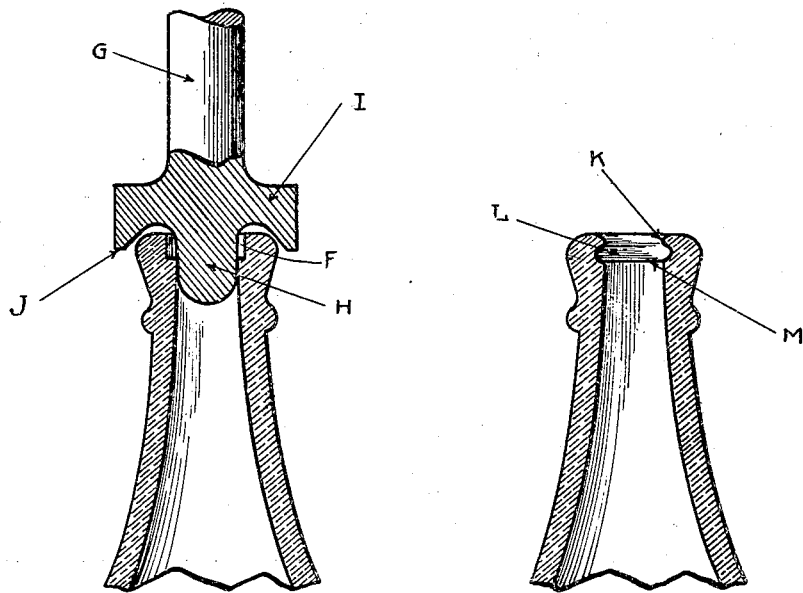

In the drawings, Figure 1 is a vertical central section through a neck-mold and part of a body-blank mold of substantially the construction shown in my previous application for patent, Serial No. 152,388, filed April 13, 1903, and showing the glass-blank and a core or plunger for forming the initial blow-opening and for forming in addition an annular recess or enlargement at the upper end of the neck. Fig. 2 is a vertical central section through the complete bottle having the enlarged annular recess formed in the neck and showing in position the tool for collapsing the upper end of the neck. Fig. 3 is a vertical central section through the neck of the completed bottle.

At the present time many bottles, especially beer-bottles, are sealed by means of a small sheet-metal plug fitting into the upper end of the neck of the beer-bottle and after being thus fitted in expanded into the groove formed on the inner face of the neck of the bottle. It is difficult and expensive to form this groove in the bottle, because it requires that the neck of the bottle shall be reheated after it is formed and usually an expanding-tool or former placed therein to shape this groove.

My process enables me to make the groove in the neck of a bottle in a simple manner and with tools which are not required to be expanded, but which can be inserted in and out of the neck of the bottle by simply a longitudinal movement.

In Fig. 1 I have shown parts of the bottle-machine previously invented by me and which is now known on the market as the "Owens" bottle-machine and which I do not deem it necessary to describe further than to point out and refer to the parts shown in Fig. 1.

A is a sectional neck-mold. B is a sectional body-blank mold, and C is a head to which these sectional molds are connected. The neck-mold and the body-blank mold together are used for forming the blank.

D is a core or plunger for making the initial blow-opening and the internal enlargement at the mouth of the bottle when my process is carried out by forming the neck at the same time that the glass is gathered from the pot or tank.

The body-blank mold B is preferably of substantially the length of the finished bottle, and at its lower end it is open, so that it may be dipped into the molten glass, and then by suitable mechanism a vacuum is formed in the channel *a*, which draws the air from the interior of the mold through the narrow port or passage *b* and causes the molten glass in the mold to flow in the body-blank mold and the neck-mold and around the upper end of the core or plunger D, forming the blowing-blank having an initial blow-opening therein. The body-blank mold B is then opened and the blowing-mold inclosed about the lower portion of the blank. The core or plunger D is withdrawn either entirely or slightly and then air is admitted into the initial blow-opening and the bottle is blown to its completed form. This part of the operation is no part of my present invention, and therefore I do not deem it necessary to describe the same further, as it is now well known to the public and in use in what is known as the "Owens" bottle-machine.

The core or plunger D extends into the neck of the bottle a distance equal to the length of the annular enlargement which is desired to be formed at the mouth, and then beyond that it terminates in a pin E', which is of a diameter of the normal opening through the neck of the bottle, c being a shoulder at the juncture of the pin E' with the body of the core or plunger.

When the glass is drawn up into the blank-forming molds, as shown in Fig. 1, and the bottle subsequently blown from the blank thus formed, the bottle will have formed in its neck an annular enlargement or recess F, (shown in Fig. 2,) which extends from the mouth of the neck of the bottle a slight distance inward.

Now in order to form an interior groove in the bottle thus shaped I reheat the end of the neck of the bottle in any desired manner, such as in a glory-hole furnace, or by a jet of gas, or in any other way, and then I upset or collapse the glass at the end of the neck inward by the tool G. This tool G has the mandrel H, adapted to fit in the formal bore of the neck of the bottle, and the annular head I with the depending annular flange J, adapted to fit around the outside of the neck of the bottle. By pressing the tool G downward when the mandrel H has been inserted in the reheated neck of the bottle, as shown in Fig. 2, the glass at the end of the neck will be collapsed and it will be forced inward to form the internal rib K, as shown in Fig. 3, which forms a groove L interiorly in the neck of the bottle between the rib K and the shoulder M, formed by the shoulder c on the core D.

Instead of forming the annular recess or groove at the time I form the blank I may make the bottle complete in the usual manner and then reheat it and form the recess F in the neck of the bottle and then collapse it thereafter.

I do not deem it necessary to describe the ordinary manner of making bottles by hand, as that is well known.

What I claim as my invention is—

1. The process of making bottles with an internal groove in the neck, which consists in making a bottle with a narrow annular recess at the upper end of the neck, and then in collapsing inward the glass at the top of this recess.

2. The process of making bottle-necks with an internal groove which consists in making a bottle with an annular enlargement at the mouth, reheating the mouth of the bottle and forming a marginal inward flange by collapsing the glass at the upper end of the neck.

3. Process of making bottle-necks with an internal groove consisting in forming a blow-opening in a plastic blowing-blank which opening is wider at its upper portion than at its lower portion, then in blowing the bottle, then in reheating the neck and collapsing the upper end of the neck inward.

In testimony whereof I affix my signature in presence of two witnesses.

MICHAEL J. OWENS.

Witnesses:
Wm. S. Walbridge,
E. H. Wise.